US009024594B2

(12) United States Patent
Reichard et al.

(10) Patent No.: US 9,024,594 B2
(45) Date of Patent: May 5, 2015

(54) SYSTEM AND METHOD FOR POWER CONVERSION FOR RENEWABLE ENERGY SOURCES

(71) Applicant: ZBB Energy Corporation, Menomonee Falls, WI (US)

(72) Inventors: Jeffrey A. Reichard, Oconomowoc, WI (US); Nathan Jobe, Germantown, WI (US)

(73) Assignee: ZBB Energy Corporation, Menomonee Falls, WI (US)

( * ) Notice: Subject to any disclaimer, the term of this patent is extended or adjusted under 35 U.S.C. 154(b) by 205 days.

(21) Appl. No.: 13/669,091

(22) Filed: Nov. 5, 2012

(65) Prior Publication Data

US 2013/0113452 A1 May 9, 2013

Related U.S. Application Data

(60) Provisional application No. 61/555,727, filed on Nov. 4, 2011.

(51) Int. Cl.
*G05F 1/00* (2006.01)
*G05F 5/00* (2006.01)

(52) U.S. Cl.
CPC . *G05F 5/00* (2013.01); *Y02E 10/76* (2013.01); *Y02E 60/60* (2013.01)

(58) Field of Classification Search
USPC ......... 363/34, 35, 36, 37, 84, 85, 88–90, 207, 363/222
See application file for complete search history.

(56) References Cited

U.S. PATENT DOCUMENTS

| 4,667,283 | A | 5/1987 | Seki et al. | |
|---|---|---|---|---|
| 5,654,883 | A * | 8/1997 | Takehara et al. | 363/79 |
| 6,906,503 | B2 * | 6/2005 | Lopez-Santillana et al. | 323/283 |
| 7,012,413 | B1 * | 3/2006 | Ye | 323/284 |
| 7,049,793 | B2 * | 5/2006 | Itoh et al. | 323/222 |
| 7,688,046 | B2 | 3/2010 | Li et al. | |
| 7,821,237 | B2 * | 10/2010 | Melanson | 323/222 |
| 2004/0036450 | A1 * | 2/2004 | Aiello et al. | 323/222 |
| 2005/0219883 | A1 | 10/2005 | Maple et al. | |
| 2006/0250115 | A1 | 11/2006 | Johnson | |

FOREIGN PATENT DOCUMENTS

WO 2011115952 A1 9/2011

OTHER PUBLICATIONS

International Search Report and the Written Opinion of the International Searching Authority, dated Mar. 15, 2013 for Application No. PCT/2012/063582, 10 pages.

* cited by examiner

*Primary Examiner* — Nguyen Tran
(74) *Attorney, Agent, or Firm* — Boyle Fredrickson, S.C.

(57) ABSTRACT

A power converter is configured to transfer energy from a photovoltaic (PV) array to a DC bus internal to the power converter. The power converter executes a modulation module to selectively connect one or more switching devices between the output of the PV array and the DC bus. The power converter is configured to operate in multiple operating modes. In one operating mode, the converter operates with a fixed modulation period and a variable on time, and in another operating mode, the converter operates with a variable modulation period and a fixed on time. The improved power converter provides highly efficient low power energy capture, improving power efficiency and enabling energy capture in low light conditions with reduced converter losses.

6 Claims, 3 Drawing Sheets

SYSTEM AND METHOD FOR POWER CONVERSION FOR RENEWABLE ENERGY SOURCES

CROSS-REFERENCE TO RELATED APPLICATIONS

This application claims priority to U.S. provisional application Ser. No. 61/555,727, filed Nov. 4, 2011, the entire contents of which is incorporated herein by reference.

BACKGROUND OF THE INVENTION

The subject matter disclosed herein relates to power converters and, more specifically, to improved power conversion for renewable energy systems during periods of low power production.

In recent years, increased demands for energy and increased concerns about supplies of fossil fuels and their corresponding pollution have led to an increased interest in renewable energy sources. Two of the most common and best developed renewable energy sources are photovoltaic energy and wind energy. Other renewable energy sources may include fuel cells, hydroelectric energy, tidal energy, and biofuel or biomass generators. However, using renewable energy sources to generate electrical energy presents a new set of challenges.

Many renewable energy sources provide a variable supply of energy. The supply may vary, for example, according to the amount of wind, cloud cover, or time of day. Further, different energy sources provide different types of electrical energy. A wind turbine, for example, is better suited to provide Alternating Current (AC) energy while a photovoltaic cell is better suited to provide Direct Current (DC) energy. Due to the variable nature of the energy supplied as well as the varying type of energy generated, power converters are commonly inserted between the renewable energy source and the utility gird or an electrical load, if operating independently of the utility grid.

It is known that power converters have inherent losses which prevent all of the power generated by the renewable energy source from being converted to usable electrical energy. At low levels of power generation, the energy losses may be greater than the power being generated by the renewable energy source. The power converter is typically switched off to avoid an operating condition in which the power generation system is actually using more energy than it is generating.

Thus, in order to maximize the efficiency of the power generation system, it is desirable to provide a converter able to efficiently operate at a very wide range of power generation levels.

BRIEF DESCRIPTION OF THE INVENTION

The subject matter disclosed herein discloses a power converter configured to transfer energy from a photovoltaic (PV) array to a DC bus internal to the power converter. The power converter executes a modulation module to selectively connect one or more switching devices between the output of the PV array and the DC bus. The power converter is configured to operate in multiple operating modes. In one operating mode, the converter operates with a fixed modulation period and a variable on time, and in another operating mode, the converter operates with a variable modulation period and a fixed on time. The improved power converter provides highly efficient low power energy capture, improving power efficiency and enabling energy capture in low light conditions with reduced converter losses According to one embodiment of the invention, a power converter includes an input configured to receive power from a DC source, a DC bus having a positive and a negative rail, at least one switching device selectively connecting the input to the DC bus as a function of a corresponding control signal, a memory device storing a series of instructions, and a controller. The controller is configured to execute the series of instructions to determine a magnitude of power generated by the DC source, generate the control signal for each switching device in a first operating mode when the magnitude of power generated by the DC source exceeds a predefined threshold, and generate the control signal for each switching device in a second operating mode when the magnitude of power generated by the DC source is less than the predefined threshold. The series of instructions includes a modulation module having a modulation frequency and an on time. During the first operating mode, the controller may execute the modulation module to generate control signals at a fixed modulation frequency with a varying on time, and during the second operating mode, the controller may execute the modulation module to generate control signals at a varying modulation frequency with a fixed on time.

According to another aspect of the invention, the memory device stores a lookup table defining the rate of change of the modulation frequency during the second operating mode as a function of the current modulation frequency. It is contemplated that the modulation frequency may vary from about 10 kHz to about 50 Hz.

According to another embodiment of the invention, a method of converting power from a renewable energy source having a variable power generation capability to a voltage potential present on a DC bus via a power converter is disclosed. The method includes the steps of monitoring a magnitude of power generated by the renewable energy source, controlling at least one switching device in the power converter via a corresponding control signal to selectively connect the renewable energy source to the DC bus, executing a modulation module in the power converter to generate the control signals in a first operating mode when the magnitude of power generated by the renewable energy source exceeds a predefined threshold, and executing the modulation module in the power converter to generate the control signals in a second operating mode when the magnitude of power generated by the renewable energy source is less than the predefined threshold.

According to another aspect of the invention, the modulation module determines an on time for each of the control signals within a switching period, where the switching period is defined as the inverse of a modulation frequency. During the first operating mode, the modulation module generates control signals at a fixed modulation frequency with a varying on time, and during the second operating mode, the modulation module generates control signals at a varying modulation frequency with a fixed on time.

According to yet another aspect of the invention, executing the modulation module in the power converter to generate the control signals in a second operating mode may include the steps of reading a desired change in the modulation frequency from a look up table stored in a memory device of the power converter and varying the modulation frequency includes adding or subtracting the desired change as a function of the magnitude of power generated by the renewable energy source.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWING(S)

Various exemplary embodiments of the subject matter disclosed herein are illustrated in the accompanying drawings in which like reference numerals represent like parts throughout, and in which.

Figure 1:
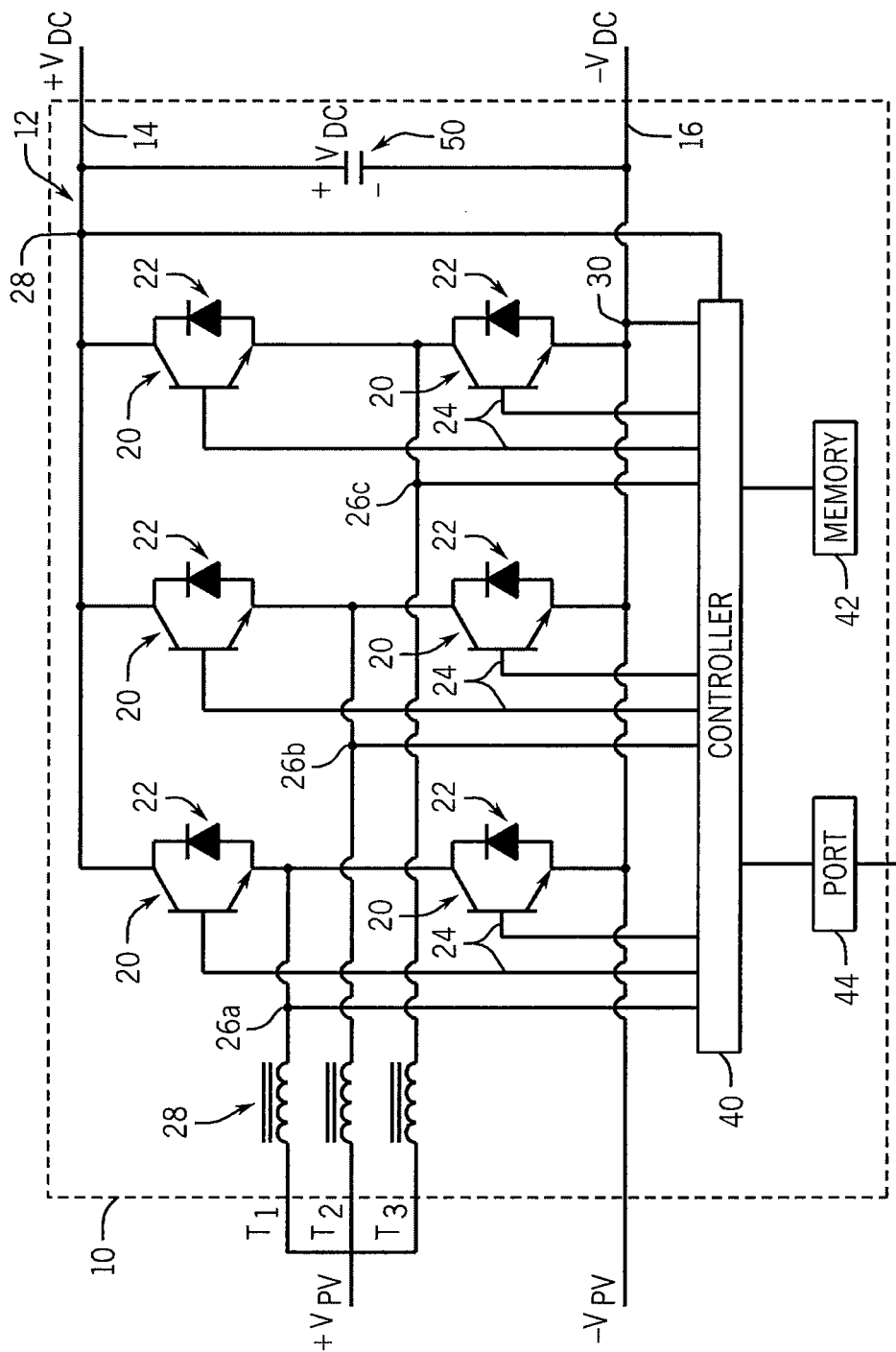
FIG. 1 is a schematic representation of a converter according to one embodiment of the present invention.

In describing the preferred embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

The various features and advantageous details of the subject matter disclosed herein are explained more fully with reference to the non-limiting embodiments described in detail in the following description.

Turning initially to FIG. 1, an exemplary converter 10 incorporating one embodiment of the present invention is illustrated. The converter 10 includes three input terminals, $T_1$-$T_3$, configured to receive input voltages. The input terminals, $T_1$-$T_3$, of the illustrated embodiment are connected together to receive a positive terminal, $+V_{pv}$, from a photovoltaic array generating a DC voltage. Optionally, each of the input terminals, $T_1$-$T_3$, may be connected to separate terminals from different photovoltaic arrays. The negative terminal, $-V_{pv}$, from the photovoltaic array is connected to the negative rail 16 of the DC bus 12. According to still other embodiments of the invention, a single input terminal, $T_1$, may be provided or various other number of input terminals, $T_x$, may be provided according to the configuration of the PV array. An input filter 28 provides inductance connected in series with each of the terminals, $T_1$-$T_3$.

The converter 10 converts the input voltage from the PV array to the desired DC voltage, $V_{dc}$, present on the DC bus 12 using switching devices 20. The DC bus 12 includes a positive rail 14 and a negative rail 16 which are made available at outputs, $+V_{dc}$ and $-V_{dc}$. As is understood in the art, the positive rail 14 and the negative rail 16 may conduct any suitable DC voltage potential with respect to a common or neutral voltage and are not limited to a positive or a negative DC voltage potential. Further, either of the positive rail 14 or the negative rail 16 may be connected to a neutral voltage potential. The positive rail 14 typically conducts a DC voltage having a greater potential than the negative rail 16.

The switching devices 20 are typically solid-state power devices. FIG. 1 shows the switching devices 20 as bipolar junction transistors (BJTs); however, it is contemplated that any suitable switching device according to the application requirements may be used, including, but not limited to, insulated gate bipolar transistors (IGBT), field effect transistors (FETs), silicon controlled rectifiers (SCR), thyristors such as integrated gate-commutated thyristor (IGCT) or gate turn-off thyristors (GTO), or other controlled devices. A diode 22 is connected in parallel to each of the switching devices 20 for reverse conduction across the switching device as required when the switching device 20 is turned off. This diode 22 may also be a part of the semiconductor switch. Each switching device 20 is controlled by a control signal 24. The control signal 24 is enabled or disabled to selectively permit conduction through the switching device 20, which, in turn, selectively connects either the positive rail 14 or the negative rail 16 to one of the input terminals, $T_1$-$T_3$. A capacitance 50 is connected between the positive rail 14 and the negative rail 16 of the DC bus 12. The capacitance 50 may be a single capacitor or any number of capacitors connected in series or parallel according to the system requirements. The capacitance 50 is configured to reduce the magnitude of ripple voltage resulting from the voltage conversion between the input voltage and the DC bus 12.

A controller 40 executes a series of stored instructions to generate the control signals 24. The controller 40 receives feedback signals from sensors corresponding to the amplitude of the voltage and/or current at various points throughout the converter 10. The locations are dependent on the specific control routines being executed within the controller 40. For example, input sensors, 26a-26c, may provide an amplitude of the voltage present at each input terminal, $T_1$-$T_3$. Optionally, an input sensor, 26a-26c, may be operatively connected to provide an amplitude of the current conducted at each input terminal, $T_1$-$T_3$. Similarly a current and/or a voltage sensor, 28 and 30, may be operatively connected to the positive rail 12 and the negative rail 16, respectively, of the DC bus 12. The controller 40 interfaces with a memory device 42 to retrieve the stored instructions and with a communication port 44 to communicate with external devices. The controller 40 is configured to execute the stored instructions to control the converter 10 as described herein.

Figure 2:
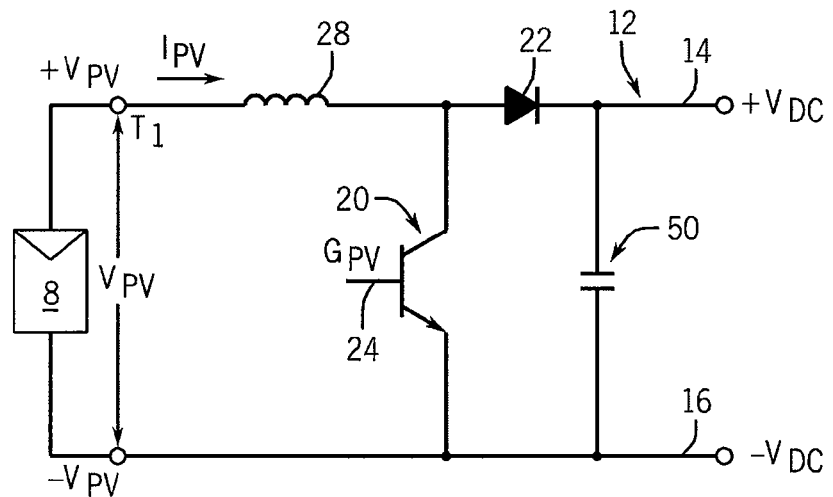
FIG. 2 is a schematic representation of a portion of the elements from one phase of the converter of FIG. 1.

The converter 10 of FIG. 1 is converts a DC voltage having a first potential and present at the input terminals, $T_1$-$T_3$, to a second potential present at the DC bus. According to one embodiment of the invention, FIG. 2 illustrates a portion of the elements from one phase of the converter 10 configured to operate as a boost converter. A solar, or PV, array 8 generates a DC voltage, $V_{pv}$, which is connected between the input terminal, $T_1$, and the negative rail 16. One phase of the input filter 28 provides the input inductance between the input terminal, $T_1$, and one of the lower switches 20. One of the upper diodes 22 provides the output conduction path between the lower switch 20 and the DC bus 12 when the lower switch 20 is off. Modulation of the lower switch 20 by a control signal 24, sometimes referred to as a gate signal, $G_{pv}$, operates to boost the amplitude of the voltage present at the input terminal, T1, to a greater amplitude on the DC bus 12. Although a multiphase power converter is illustrated in FIG.

1, it is contemplated that the power conversion method described herein may be equally applicable to a single phase power converter or other DC-to-DC converters as is demonstrated by the single phase representation of FIG. 2.

Figure 3:
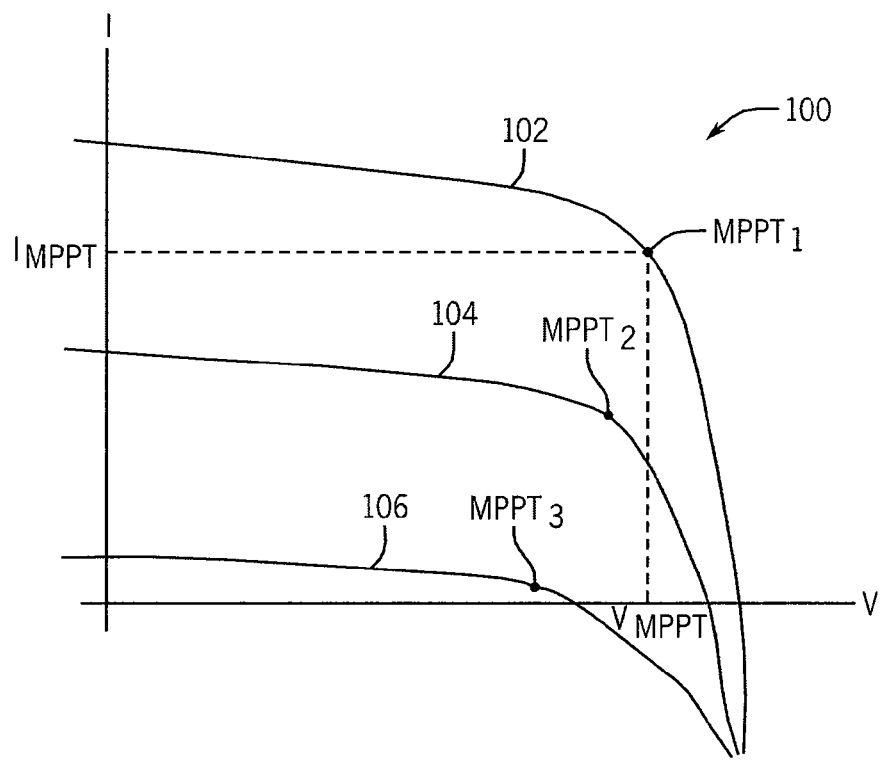
FIG. 3 is a graphic representation of the power generated by a photovoltaic array at varying levels of insolation.

In operation, the converter 10 converts the power supplied from a variable power energy source to power present on the DC bus 12 of the converter. As is known in the art, PV arrays generate power as a function of the light incident on the arrays, also known as insolation. Referring next to FIG. 3, a graph 100 illustrates the voltage and current relationships for an exemplary PV array at varying levels of insolation. During periods when the PV array is receiving maximum light, it is capable of generating its maximum power as represented by the top curve 102. At periods of medium and low light intensity, the power capability of the PV array decreases as represented by curves 104 and 106, respectively. Because the current-voltage relationship is non-linear, the controller 40 executes a maximum power point tracking (MPPT) module to identify the operating point at which the maximum power can be transferred from the PV array to the DC bus 12, identified as MPPT1-MPPT3.

According to one embodiment of the invention, the controller 40 utilizes a perturb-observe type MPPT module. According to the perturb-observe type MPPT module, an initial current reference is commanded, resulting in an initial duty cycle command, D, for the control signal, $G_{pv}$, 24. The resulting current, $I_{pv}$, and voltage, $V_{pv}$, output from the PV array are measured and the resulting power is determined. Subsequently, the current reference is changed by an incremental amount in a first direction, either increased or decreased, and the resulting power output from the PV array is again determined. If the power output increased, the incremental changes are proceeding in the correct direction; however, if the power output decreased, the incremental changes are proceeding the incorrect direction and the direction of subsequent incremental changes is reversed. After identifying the correct direction for the incremental changes in the current references, the incremental changes continue until a decrease in the power output is identified. At this point, the maximum power point has been identified and the controller 40 maintains operation at this operating point. Further, the controller 40 continues to execute the MPPT module as the insolation varies to continue operating at the maximum power point corresponding to the level of light incident on the PV array.

In order to draw the desired operating current to maintain power transfer from the PV array 8 to the converter 10 at the maximum power point, the controller 40 executes a modulation module, which is stored in the memory device 42. The modulation module executes at a periodic interval, also known as the switching period, T. The switching period, T, is defined as the inverse of the modulation frequency. During the switching period, the modulation module generates a control signal 24 which enables a switching device 20 for a portion of the switching period. The portion, or percentage, of the switching period during which the switching device 20 is enabled is also known as the duty cycle, D. The MPPT module identifies a desired current that corresponds to the maximum power point and provides this current as a reference value to the modulation module within the controller 40. The modulation module uses feedback signals to determine whether the current between the PV array 8 and the DC bus 12 is greater than or less than the desired current to achieve operation at the maximum power point. The modulation module may increase or decrease the duty cycle, D, accordingly.

Figure 4:
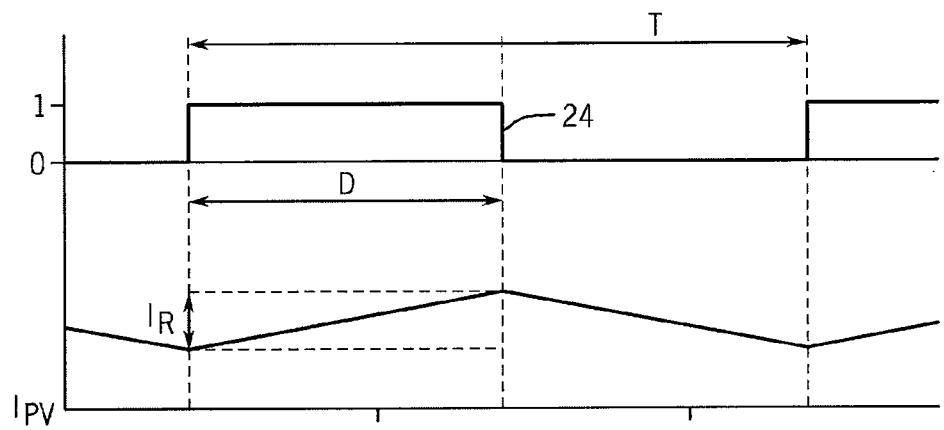
FIG. 4 is a graphic representation of the current during one modulation period of the converter of FIG. 1.

Referring next to FIG. 4, the current drawn from the PV array, $I_{pv}$, is illustrated over one switching period, T, of pulse width modulation as a function of the control signal 24 controlling the switching device 20. The control signal 24 is on for a percentage of the total switching period, T, and off for the remainder of the switching period, T. As discussed, the percentage of the switching period, T, the control signal 24 is on is referred to as the duty cycle, D, also referred to as the on time, $t_{on}$. As the control signal 24 turns on and off, the switch 20 alternately conducts and blocks current. As a result of the switching, a ripple current, $I_r$, is established. The power calculation requires an average current value. Thus, the current, $I_{pv}$, may be filtered or sampled over the entire switching period, T, and an average current for the switching period, T, is first determined. The average current is then used to determine the power output from the PV array.

The converter 10 monitors the magnitude of power generated by the PV array to determine a desired operating mode of the converter 10. During a first operating mode, the controller 40 executes the modulation module at a fixed modulation frequency while varying the on time, $t_{on}$. As previously indicated with respect to FIG. 3, as the total light incident on the PV array decreases, the amplitude of the voltage and current at the maximum power point and, consequently, the power output from the PV array, similarly decrease. Under these operating conditions, the duty cycle, D, of the control signal 24 becomes increasingly small, resulting in short periods of conduction and long periods of blocking current through the switch 20. With the controller 40 executing the modulation module at a fixed modulation frequency, the power losses in the converter 10 may exceed the power generated by the PV array 8. Previously, at this point, the converter 10 would cease operating. For example, an exemplary converter 10 capable of transferring up to 100 kilowatt of power from the PV array 8 may operate at 96% efficiency from about one quarter power (i.e. 25 kilowatts) to full power (i.e. 100 kilowatts). When the PV array 8 is only generating 10 kilowatts, or about 10% of the capacity of the converter 10, the operating efficiency drops to about 90%. Thus, the previous usable input range of the converter 10 may have been when the PV array 8 is generating between 10% and 100% of the rated capacity of the converter 10.

However, the present converter 10 has a second operating mode to expand the operating range of the converter 10. To improve efficiency, a predefined minimum value for the on time, $t_{on}$, is set. When the current required by the MPPT module causes the controller 40, executing the modulation module, to reaches this minimum value, the controller 40 begins executing the modulation module in the second operating mode. In order to continue operating at the maximum power point when the minimum on time, $t_{on}$, has been reached, the converter 10 begins varying the modulation frequency, which inversely varies the switching period, T, of the pulse width modulation.

Figure 5:
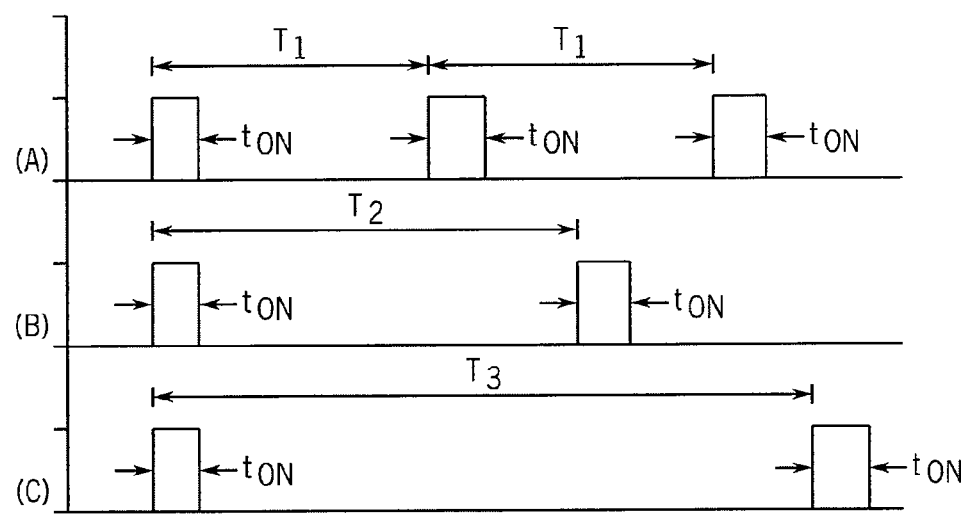
FIG. 5 is a graphic representation of a variable modulation period.

Referring next to FIG. 5, operation with a fixed on time, $t_{on}$, and varying switching period, T, is illustrated. For example, FIG. 5a may represent the point at which the first operating mode has reached its minimum on time, $t_{on}$. The period, T1 is equal to the normal operating period which may be, for example, 100 μsec, corresponding to a 10 kHz switching frequency. As the required current to remain at the maximum power point continues to decrease, the switching period may be extended, for example, to T2 and subsequently to T3. Because the switching period is being extended the modulation frequency is being decreased. As a result, the switching devices 20 are not being turned on as often, thereby reducing the corresponding switching losses. As a result, the converter 10 operates at increased efficiency at lower power levels in the second operating mode than it would in the first operating mode. For example, the converter 10 previously discussed, which was capable of transferring up to 100 kWatt of power from the PV array 8, operated at 90% efficiency at 10% of its rated capacity in the first mode of operation. In the second mode of operation, the converter 10 operates instead at about 95% efficiency at 10% of its rated capacity. The increased efficiency permits the converter to continue operating down to about 1% of its rated capacity before the power losses in the converter 10 may exceed the power generated by the PV array 8. It is contemplated that the switching period may be extended to at least 20 msec, corresponding to a 50 Hz switching frequency. Thus, as the incident light decreases, the converter 10 may continue operation across a broader operating range to increase the amount of energy obtained from the PV array.

According to another aspect of the invention, a look up table may be stored in the memory device 42 which defines the rate at which the controller 40 changes the modulation frequency during operation in the second mode. The relationship between the current and the switching period is nonlinear. For example, a 10 μsec change in the modulation period when operating at a 10 kHz switching frequency (i.e. a 100 μsec period) represents a greater percentage increment than when operating at a 50 Hz switching frequency (i.e. a 20 msec period). In order to improve the response time of the controller 40 to variations in insolation, the modulation period is changed at larger increments when the converter 10 is operating at lower modulation frequencies than when the converter is operating at higher modulation frequencies. The lookup table may store the desired incremental changes in the modulation frequency at varying operating points.

As the incident light on the PV array begins to increase and the corresponding power generated by the PV array increases, the converter 10 returns to operation in the first mode rather than operation in the second mode. The controller 40 executes the modulation module to reduce the switching period, T, until it again reaches the duration corresponding to the fixed modulation period. At this point, the operating efficiency of the converter 10 has improved such that operation with a fixed modulation period and a variable on time, $t_{on}$, operation is again desirable. The transition between operation with a fixed modulation period, T, and variable on time, $t_{on}$, to operation with a variable modulation period, t, and a fixed on time, $t_{on}$, is seamless because both operating modes encompass the common operating point at which both the modulation period, T, and the on time, $t_{on}$, are at their minimum values.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention

We claim:

1. A power converter comprising:
   an input configured to receive power from a DC source;
   a DC bus having a positive and a negative rail;
   at least one switching device selectively connecting the input to the DC bus as a function of a corresponding control signal;
   a memory device storing a series of instructions; and
   a controller configured to execute the series of instructions to:
   determine a magnitude of power generated by the DC source,
   generate the control signal for each of the at least one switching devices in a first operating mode when the magnitude of power generated by the DC source exceeds a predefined threshold, and
   generate the control signal for each of the at least one switching devices in a second operating mode when the magnitude of power generated by the DC source is less than the predefined threshold, wherein:
   the series of instructions includes a modulation module having a modulation frequency and an on time,
   during the first operating mode, the controller executes the modulation module to generate control signals at a fixed modulation frequency with a varying on time, and
   during the second operating mode, the controller executes the modulation module to generate control signals at a varying modulation frequency with a fixed on time.

2. The power converter of claim 1 wherein the memory device stores a lookup table defining a rate of change of the modulation frequency during the second operating mode as a function of the modulation frequency at which the controller is presently executing the modulation module.

3. The power converter of claim 1 wherein the modulation frequency varies from about 10 kHz to about 50 Hz.

4. A method of converting power from a renewable energy source having a variable power generation capability to a voltage potential present on a DC bus via a power converter, the method comprising the steps of:
   monitoring a magnitude of power generated by the renewable energy source;
   controlling at least one switching device in the power converter via a corresponding control signal to selectively connect the renewable energy source to the DC bus;
   executing a modulation module in the power converter to generate the control signals in a first operating mode when the magnitude of power generated by the renewable energy source exceeds a predefined threshold; and
   executing the modulation module in the power converter to generate the control signals in a second operating mode when the magnitude of power generated by the renewable energy source is less than the predefined threshold, wherein:
   the modulation module determines an on time for each of the control signals within a switching period, the switching period defined as the inverse of a modulation frequency,
   during the first operating mode, the modulation module generates control signals at a fixed modulation frequency with a varying time, and
   during the second operating mode, the modulation module generates control signals at a varying modulation frequency with a fixed on time.

5. The method of claim 4 wherein executing the modulation module in the power converter to generate the control signals in the second operating mode further comprises the steps of:
   reading a desired change in the modulation frequency from a look up table stored in a memory device of the power converter, and varying the modulation frequency includes adding or subtracting the desired change as a function of the magnitude of power generated by the renewable energy source.

6. The method of claim 4 wherein the modulation frequency varies from about 10 kHz to about 50 Hz.

* * * * *